United States Patent Office 3,126,257
Patented Mar. 24, 1964

3,126,257
PROCESS FOR PREPARING HYDROGEN PEROXIDE
Hans Kunowski and Gerhard Fix, both of Bad Hanningen (Rhine), Germany, assignors to Kali Chemie Aktiengesellschaft, Hannover, Germany
No Drawing. Filed Aug. 2, 1961, Ser. No. 139,027
Claims priority, application Germany Aug. 5, 1960
1 Claim. (Cl. 23—207)

This invention relates to a novel and improved process for producing $H_2O_2$. It has been known to produce $H_2O_2$ by a process, in which a quinone, e.g. anthraquinone is hydrogenated and the resulting hydroquinone is subsequently reacted with oxygen under liberation of $H_2O_2$ and regeneration of the quinone. The reducing and oxidizing steps are carried out in an organic solvent or solvent mixture, which dissolves the quinones as well as the hydroquinones. From the organic solution which contains the $H_2O_2$ and the quinone, the $H_2O_2$ is extracted with water. The quinone is used subsequently in a cycle of hydrogenation and oxidation for producing further amounts of $H_2O_2$ in a cyclic process. However, in this very elegant process various difficulties are encountered which considerably affect the economy and use of the process. Thus, the contamination of the organic solution by small amounts of metal compounds originating from the apparatus used cannot be always safely avoided and these compounds can attain a concentration, at which they cause catalytic decomposition of the $H_2O_2$ present in the organic solution. If said metal compounds, and even their traces, are not continuously removed from the organic reaction solution, the catalytic decomposition caused by them can result in a considerable reduction of the yield, and even the course of the reaction can be disturbed.

A further essential difficulty is encountered in the continuous extraction of the $H_2O_2$ with water from the organic solution. It is thereby necessary to attain practically complete extraction of $H_2O_2$ by the water, without the occurrence of losses of the recycled organic solution, due to emulsification in the aqueous phase. Such emulsification can be substantially avoided at the beginning of the operation by suitable selection of the organic solvents. However, after a certain period of operation, the recycled organic solution shows the tendency to form emulsions with the water used for extraction, to an increasing extent. While fresh organic solutions show practically complete separation from the aqueous phase after extraction by the latter, after increased periods of operation the separation of the organic solution from the aqueous phase becomes increasingly slower. The separating layer shows lack of sharpness and becomes indefinite and the originally clear aqueous layer becomes turbid and milky.

The formation of emulsions can be considerably reduced by increasing the extraction temperature. However, the use of increased extraction temperatures results in losses of $H_2O_2$, because at increased temperatures increased amounts of $H_2O_2$ remain dissolved in and thus retained by the organic reaction solution.

It is possible to purify the beforementioned turbid aqueous extraction solution, e.g. by extraction with an organic solvent or by the action of a solid adsorptive agent, whereby dissolved or emulsified particles of the organic solution can be removed. However, such purification requires additonal operating steps and equipment and increases the expenses of the process.

Finally, it is in many cases necessary to subject the recycled organic reaction solution prior to returning it to the hydrogenation step, to purification in order to remove from it traces of metals and other impurities entering it during its circulation. Such purification is usually carried out by washing the organic solution with water, which—after its use for purification—contains only very small amounts of $H_2O_2$, but may contain essential amounts of the organic solution, which are lost unless said water is further subjected to a relatively troublesome and expensive purification.

It has now been unexpectedly found that the above described difficulties can be avoided by using for the extraction of $H_2O_2$ from the organic reaction solution water which is freed from mineral ingredients and has been adjusted to an acid pH value by the addition of an acid. It has been found that by using for extraction of the $H_2O_2$ water which has a pH value of less than 6, the traces of metals present in the organic reaction solution are continuously removed and simultaneously the formation of emulsions is prevented. Upon adjusting the pH of the water to a value below 6, preferably 2–4 and using this water for extraction of the $H_2O_2$, an immediate, clear separation of the organic solution from the aqueous phase takes place. Moreover, by proceeding in this manner, the removal of metals from the organic reaction solution by a separate step becomes unnecessary.

A further advantage of the invention consists in that the extraction of $H_2O_2$ can be carried out by relatively low temperatures so that losses of $H_2O_2$ can be further reduced. Although the effect of temperature on the distribution coefficient of $H_2O_2$ between the organic and aqueous phase is influenced by the chemical nature of the organic phase, it is a generally valid rule that the yield of extraction decreases upon increase of the temperature, under otherwise equal conditions. It should be also taken into consideration that the liability to decomposition of $H_2O_2$ increases with increasing temperature and temperatures above 50° C. can cause noticeable decomposition of $H_2O_2$. It is, therefore, desirable to carry out extraction of $H_2O_2$ at a temperature which is as low as possible. As the practically lowest limit of extraction temperature is determined by the temperature of cooling water—which is in general not lower than 15° C.—it is preferred to carry out the extraction of $H_2O_2$ in the range of 15–50° C.

The adjustment of the pH of the water used for extraction, can be carried out by the addition of an acid. In selecting the acid used for said adjustment it should be taken into consideration that the acid should be practically insoluble in the organic reaction solution and completely soluble in water. The use of phosphoric acid for adjustment is preferred if stabilization of the $H_2O_2$ prior to its further processing—e.g. by distillation for obtaining a more concentrated commercial product—is effected by phosphoric acid. However, other acids, such as e.g. $HNO_3$, $HCl$, $H_2SO_4$ or others can likewise be used.

If—for special reasons—a separate purification with water of the recycled organic solution is carried out, the water used for such purification must be likewise acidified in the manner described above in order to remove traces of metals.

It will be appreciated that the process of the invention represents an improvement of high utility. The utility resides in the removal of metal impurities from the organic reaction solution by the water used for extracing the $H_2O_2$, in increased yields of $H_2O_2$, elimination or reduction of the losses of organic solution, which are caused by emulsification in water, and elimination of the above described emulsion formation.

It will be understood from the above that this invention is not limited to the specific materials, process steps, conditions and other details specifically described above and can be carried out with various modifications. Thus, the hydrogenation and subsequent oxidation can be carried out in the reaction solution according to any conventional procedures or other suitable procedures. The mineral ingredients can be removed from the water used for extraction of the $H_2O_2$ from the organic reaction solution likewise according to any suitable process, for example by distillation of the water or treatment of the water with ion exchangers e.g. zeolites.

The abbreviation "p.p.m." is used herein to denote parts per million. These and other modifications can be made without departing from the scope of the invention as defined by the appended claims. The term "metallic impurity" is used herein to denote impurities originating from metallic apparatus. The parts and the like are by weight if not otherwise stated. In both tables of figures in column 4 the abbreviation "/1." stands for per liter.

The following examples describe, by way of example and without limitation, some specific embodiments of and best modes for carrying out the invention.

*Example 1*

The organic solution used is composed of 120 parts by weight of ethylanthraquinone, 380 parts by weight of octyl alcohol and 500 parts by weight of benzene. In a recycling apparatus per hour 10 liters of this solution are alternately hydrogenated and subsequently oxidized in conventional manner. The $H_2O_2$ present in the solution after oxidation, is extracted by 500 cm.$^3$ of water, which was freed from mineral ingredients and has a pH value of 7.0.

After operating for 4 weeks, the Ni-content of the recycled solution increased to more than 4 p.p.m., while the aqueous phase contained at the same time less than 0.01 p.p.m. of Ni. In order to purify the recycled solution from Ni, which has a catalytic decomposition effect on $H_2O_2$, the pH of the water (which was freed from mineral ingredients) used for extraction of $H_2O_2$ was adjusted to a pH of 3.0 by the addition of phosphoric acid. After further operating for 8 days the Ni-content in the organic solution decreased to less than 0.2 p.p.m., while it simultaneously increased in the aqueous phase to 0.5–1.00 p.p.m. These values practically did not change during further operation for more than 3 months, in which the pH value of the water was kept in the range of 2–4.

*Example 2*

In order to show the effect of the pH value of the water on the period of time needed for the formation of a clear separating layer between the organic phase and the aqueous extracting phase, 50 ml. of the organic solution to be recycled according to the above Example 1 were emulsified with 50 ml. of water freed from mineral ingredients and having varying pH values, for 20 seconds by means of an emulsifying instrument under otherwise equal conditions. The pH value of the water was adjusted by the addition of n/10 NaOH and n/10 phosphoric acid. Subsequently the time necessary for separation of the two phases and formation of a clear separating layer were determined and gave the following results:

| pH value: | Separation (time) |
|---|---|
| pH=1 | Immediately. |
| pH=2 | Do. |
| pH=3 | Do. |
| pH=4 | Do. |
| pH=5 | Do. |
| pH=6 | Do. |
| pH=7 | Do. |
| pH=8 | 2 minutes. |
| pH=9 | 30 minutes. |

*Example 3*

The organic solution is composed of 30 parts by weight of ethyltetrahydroanthraquinone and 90 parts by weight ethylanthraquinone, 380 parts by weight of octylalcohol and 500 parts by weight of benzene. 50 cm.$^3$ of this solution were emulsified in the manner described in the above Example 2 with 50 cm.$^3$ of water. In dependence on the pH value of the water, the following times of separation of the emulsions obtained from the 50 cm.$^3$ of organic solution and 50 cm.$^3$ of water of varying pH were measured.

| pH of the water: | Time of separation of the emulsion |
|---|---|
| pH=1 | About 2 minutes. |
| pH=2 | Do. |
| pH=3 | Do. |
| pH=4 | About 40 minutes. |
| pH=5 | About 6 hours. |
| pH=6 | About 12 hours. |
| pH=7 | About 16 hours. |
| pH=8 | About 28 hours. |
| pH=9 | About 38 hours. |
| pH=10 | About 48 hours. |

*Example 4*

The organic solution to be circulated is composed of 90 parts by weight of tertiary-butyl-anthraquinone, 30 parts by weight of tertiary-butyl-tetrahydroanthraquinone, 380 parts by weight of octylalcohol and 500 parts by weight of benzene. 10 liters of this solution are extracted in each of two parallel tests with 300 cm.$^3$ of water freed from mineral ingredients and having differing pH values in an extraction machine with about 2.5 theoretical plates or trays. The pH values of the water were adjusted by n/10 NaOH-solution and n/10 phosphoric acid. Subsequently, the amounts of ingredients present in the water, of the reaction solution were determined with the following results:

|  | pH=8.6 | pH=6.0 |
|---|---|---|
| Mg. of circulated solution/l | 1,761.0 | 698.0 |
| Mg. of octylalcohol/l | 682.0 | 423.0 |
| Mg. of benzene/l | 889.4 | 251.3 |
| Mg. of tetrahydroquinone/l | 71.8 | 6.4 |
| Mg. of quinone/l | 117.8 | 17.3 |

*Example 5*

10 liters of an organic solution to be circulated having the composition described in the above Example 4 were extracted in each of two parallel tests with 300 cm.$^3$ of water freed from mineral ingredients and having differing pH values, in the manner described in said Example 4. The pH values of the water were adjusted by n/10 NaOH and n/10 $HNO_3$ solution. Subsequently the amounts of ingredients present in the water of the reaction solution were determined with the following results:

|  | pH=8.6 | pH=4.1 |
|---|---|---|
| Mg. of circulated solution/l | 1,761.0 | 444.0 |
| Mg. of octylalcohol/l | 682.0 | 322.0 |
| Mg. of benzene/l | 889.4 | 110.9 |
| Mg. of quinone/l | 117.8 | 7.6 |
| Mg. of tetrahydroquinone/l | 71.8 | 3.5 |

What is claimed is:

In a process for producing hydrogen peroxide by hydrogenation of a quinone in solution to the corresponding hydroquinone and subsequent recovery of the quinone with oxygen with simultaneous formation of hydrogen peroxide which is recovered by extraction of the hydrogen peroxide containing solution with acidified, demineralized water, the improvement in which the acidified, demineralized water used for extraction has a pH value in the range between 2 and 4.

References Cited in the file of this patent

UNITED STATES PATENTS 2,995,424     Farrell     Aug. 8, 1961